W. R. LOW & A. ADAMS.
HARVESTER.
No. 99,451.   Patented Feb. 1, 1870.
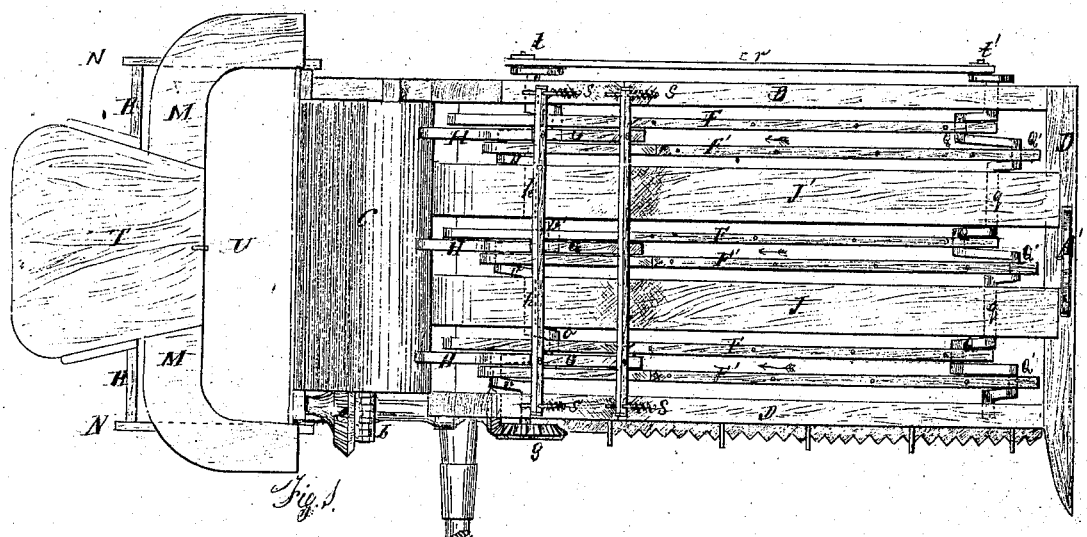
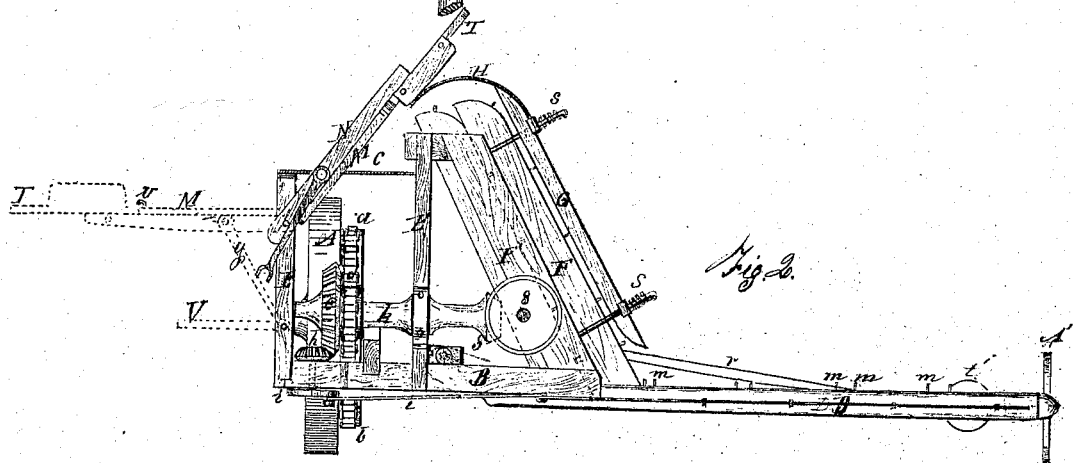
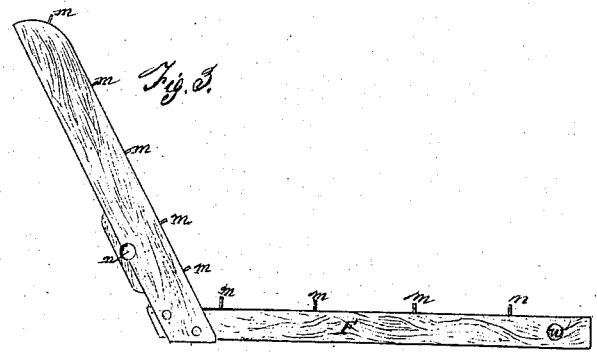
WITNESSES:
INVENTORS:
William R. Low
Augustus Adams
by Lewis L. Coburn
Att.

United States Patent Office.

WILLIAM R. LOW AND AUGUSTUS ADAMS, OF SANDWICH, ILLINOIS.

Letters Patent No. 99,451, dated February 1, 1870.

IMPROVEMENT IN HARVESTERS.

The Schedule referred to in these Letters Patent and making part of the same.

We, WILLIAM R. LOW and AUGUSTUS ADAMS, of Sandwich, in the county of De Kalb, and State of Illinois, have invented certain Improvements in Harvesters, of which the following is a specification.

Our invention has for its object to raise the grain from the platform as it falls before the sickles, and deliver it upon a receiving-table convenient to the binder's table, by means of several vibrating bars that are hung in an open platform, and have an alternate, or walking motion, as hereafter described.

It has for its further object a novel binder's table, constructed in an elliptical or semicircular form, and hinged to the harvester-frame, and there is also hinged to this binder's table a leaf or bundle-receptacle, sufficiently capacious to contain enough sheaves to make a shock, and which may be tilted by loosening a catch or spring, so that the sheaves or bundles to form a shock will all fall to the ground together, thus saving the labor of collecting the same by hand.

Description of the Accompanying Drawings.

Figure 1 is a plan of the harvester.
Figure 2 is a front elevation.
Figure 3 is a side view of the elevating-bars.

General Description.

A is a wheel, which carries the frame B, from which an upright frame-work, E, is built, on both sides of the wheel A.

Extending from one side of this frame-work to the other, and directly over the said wheel A, is the grain-receiving table C.

The object of the following described mechanism is to convey the grain, as it falls over the sickle-bar, to the said receiving-table C.

Upon the under side of the drive-wheel A is carried a rag-wheel, $a$, around which passes the endless chain $d$, moving a second rag-wheel, $b$, which is carried by the shaft $k$, said shaft $k$ having bearings upon the upright frame-work E.

The shaft $k$ carries also two mitred cog-wheels $e$ and $f$, of which the cog-wheel $e$ meshes into a cog-wheel, $h$, communicating, through a crank and pitman, $i$ $i$, motion to the sickles, and the cog-wheel $f$ meshes into a cog-wheel, $g$, communicating, through a series of alternating cranks, O O', placed along its shaft $p$, an alternate or walking-motion to the vibrating bars F and F'.

The said vibrating bars F and F' are swung, at their other and outer ends, to another series of corresponding cranks, Q Q', placed along a corresponding shaft, $q$, to which motion is communicated from the shaft $p$, by an arm, $r$, and cranks $t$ $t$.

The vibrating bars F and F', one of which is shown at fig. 3, detached, are made of two pieces, one lying horizontally and the other attached to the end of the horizontal piece, and raised at an angle such as will elevate the grain to the desired height.

Along their upper edges, the vibrating bars have pegs or pins $m$, pointing upward, which serve to catch and hold the grain from sliding, as will be hereinafter more fully shown.

$n$ and $n'$ are the bearings of the several cranks O and Q.

G is a grate, held down by the springs S.

At its top part are the curved guides H. The object of this grate and guides is to prevent the grain from falling, or being blown back from the upright bars as it is being elevated and carried over upon the receiving-table C.

The platform of the harvester is made open, and is composed of a frame, D, that is firmly attached to the frame B, above described, and the vibrating bars E and F' and pieces J and J'. The outer end of the platform is supported upon the small wheel A'.

The operation of the above-described mechanism will be as follows:

As the grain is cut and falls upon the platform, the vibrating bars F', moving in the direction of the arrows upon fig. 1, lift the grain and carry it in the direction of the said arrows, as far as their motion in that direction continues, the same being measured by the reach of the cranks above described.

Meanwhile the alternating set of bars F is moving beneath in the opposite direction, and begins to come up just as the bars F' begin to go down, so that the grain is taken up by the bars F at the point at which it was left by the bars F', and carried along to a like distance, so that the grain is constantly moving in the direction of the arrows.

The teeth or pins $m$, above described, catch into the grain and prevent its slipping.

The stream of grain reaches the part of the platform which slants upward; here it passes under the grate, which, by means of the springs S, presses it upon the bars F and F', which here also slant upward, as above described.

Owing to the changed direction of the said bars, their action is now changed from a horizontal to a lifting motion, and the stream of grain prevented from slipping by the pins $m$, is elevated along up the slanting portion of the platform and under the pressing-grate G, until, guided by the guides H, it flows upon the receiving-table C, ready to the binder's hand, squarely and evenly laid, and in a good condition for binding.

The binder's table, which we will now proceed to describe, consists of the pieces M, resting on and fastened to the bars N, which are pivoted to the upright frame-work E, above described, so that the whole table may be turned up in the manner shown at fig. 2, when it is desired to economize space in storing the harvester, or for the purpose of driving through a gate or other narrow way.

T is a tilting leaf, swung upon the shaft R, which pivots in the other ends of the bars N.

When brought down and fastened by the spring-catch U, the said leaf T comes level and flush with, and, at the same time, extends considerably to the rear of the pieces M. The whole, together, forms a table.

The binder stands between this table and the grain-receiving table C, his weight resting upon the foot-board V.

When sufficient of the cut grain has fallen upon the receiving-table C, it is seized and bound, and the bundle cast upon the tilting leaf T.

When a sufficient number of bundles to form a shock have been thus cast, the spring-catch U is loosened, and the leaf T, being tilted by the weight of the bundles, allows the same to drop to the ground together.

The table is supported in its horizontal position by the swinging braces Y, pivoted to the bars N, and bracing upon pins in the upright frame-work E.

We claim, as our invention—

1. An open harvester-platform, consisting of the frame D, vibrating bars F and F', and pieces J and J', constructed and operating substantially as and for the purposes described and shown.

2. The combination of the grate G, provided with springs S, with the vibrating bars F F', and pieces J J', operating substantially as described and shown, and constructed substantially as specified.

3. The binder's table M M, having the bundle-receptacle T hinged thereto, in the manner described and for the purpose specified, and the whole being pivoted to the harvester to economize space, when desired, substantially as specified.

WILLIAM R. LOW.
AUGUSTUS ADAMS.

Witnesses:
H. S. HILLS,
JOHN W. CASS.